Figure 1:
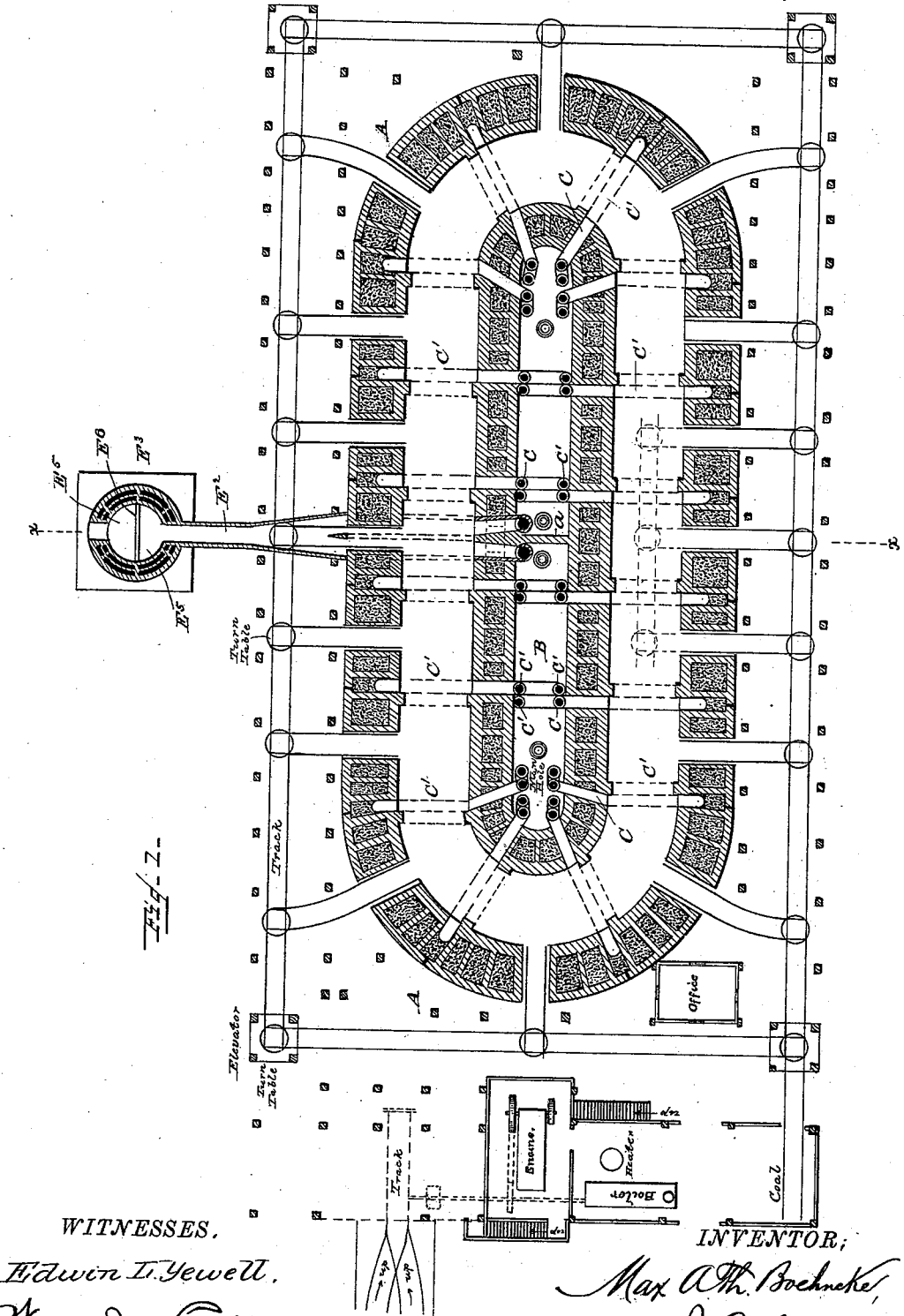

(No Model.) 4 Sheets—Sheet 1.

M. A. T. BOEHNCKE.
CONTINUOUS BRICK KILN.

No. 392,985. Patented Nov. 20, 1888.

WITNESSES.
Edwin L. Yewell.
Wm. J. Littell.

INVENTOR:
Max A. Th. Boehncke,
by J. R. Littell,
Attorney.

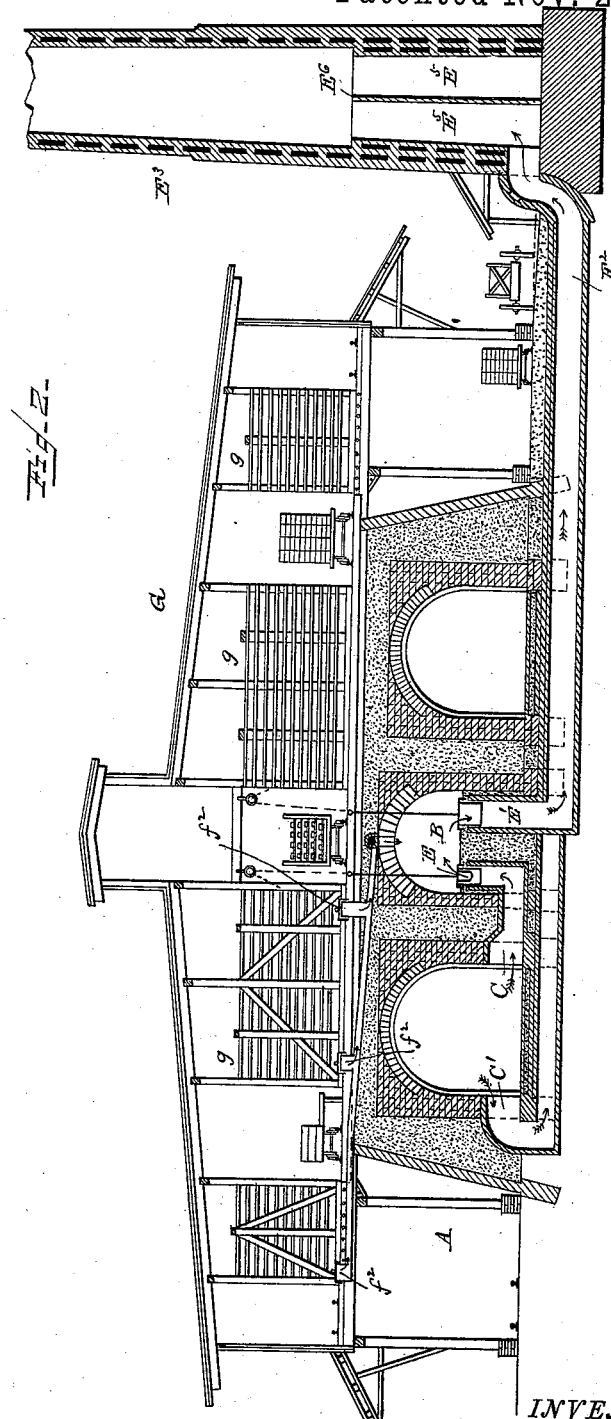

(No Model.) 4 Sheets—Sheet 3.
M. A. T. BOEHNCKE.
CONTINUOUS BRICK KILN.
No. 392,985. Patented Nov. 20, 1888.
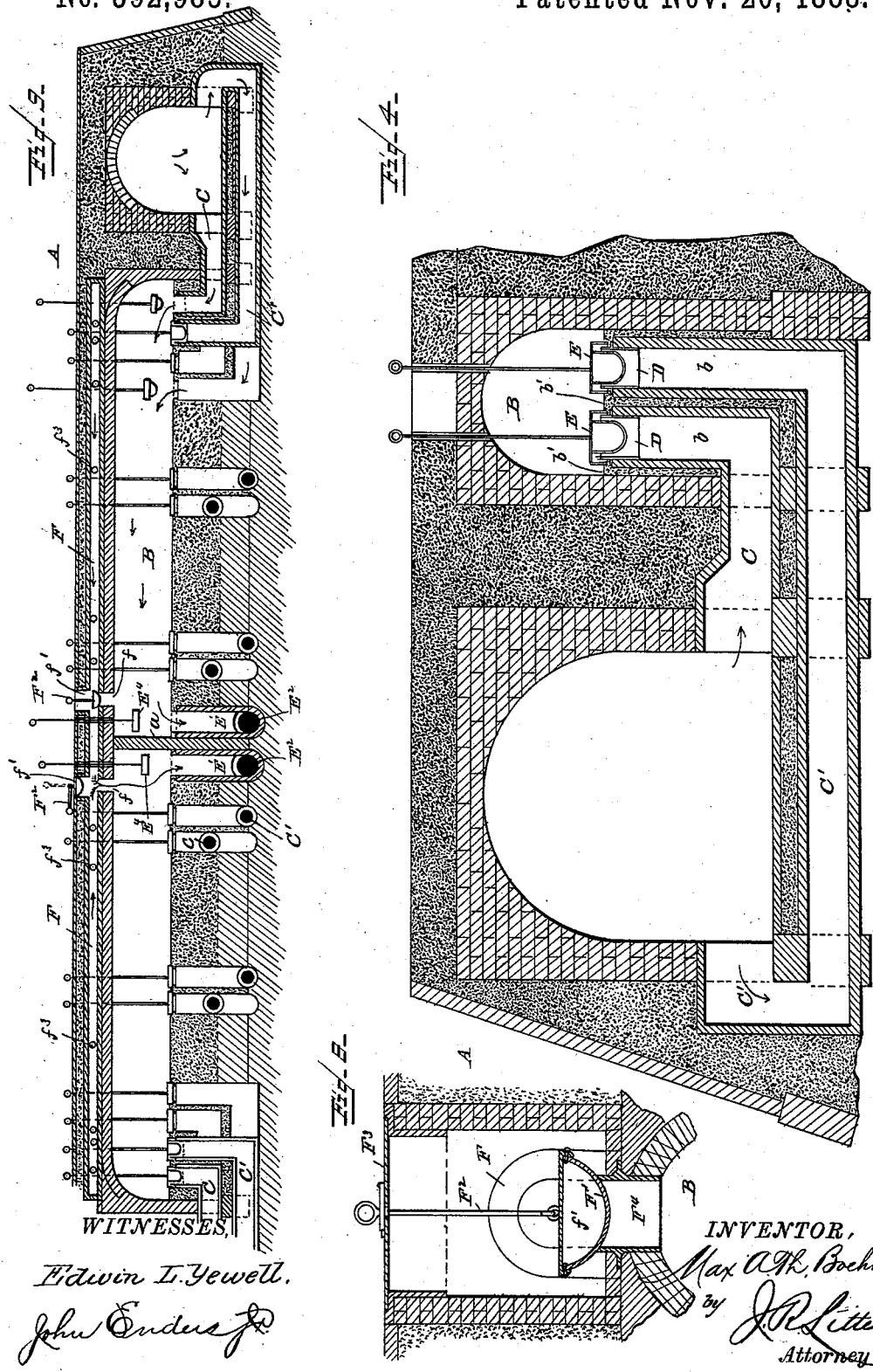
WITNESSES
Edwin L. Yewell.
John Enders Jr.
INVENTOR,
Max A. Th. Boehncke,
by J. R. Littell,
Attorney.
N. PETERS, Photo-Lithographer, Washington, D. C.

(No Model.)  M. A. T. BOEHNCKE.  4 Sheets—Sheet 4.
CONTINUOUS BRICK KILN.
No. 392,985.  Patented Nov. 20, 1888.
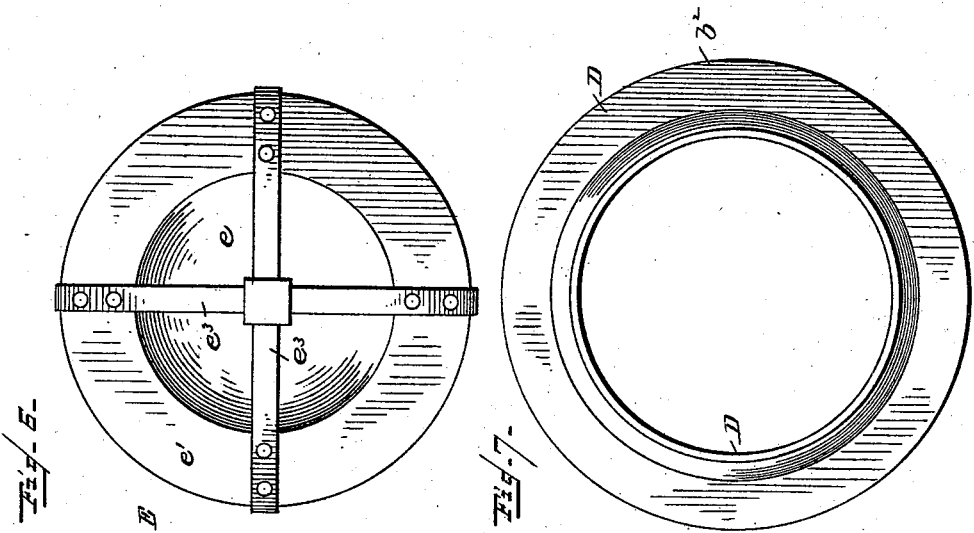
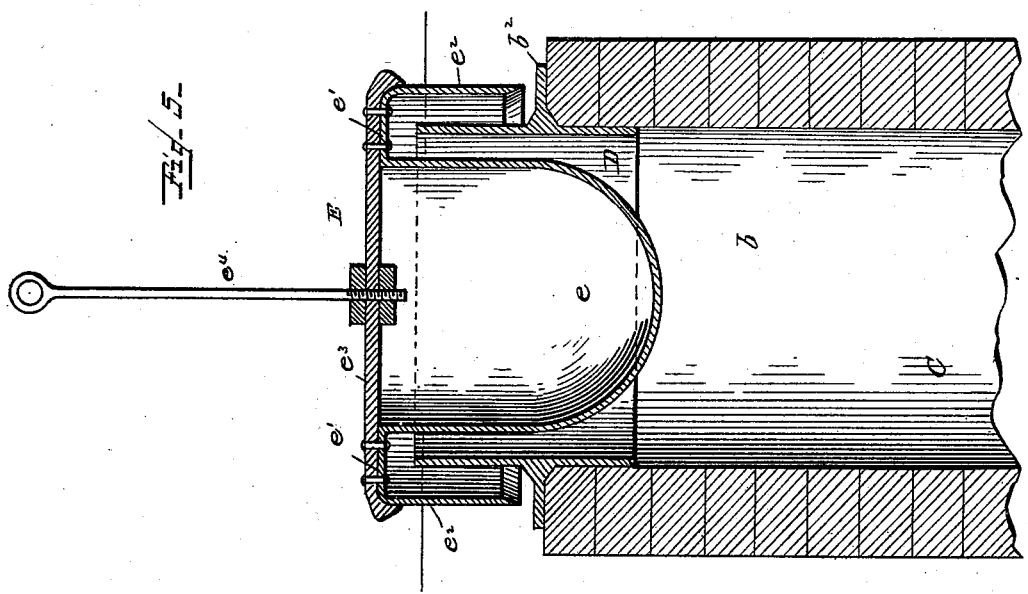
WITNESSES,
Edwin L. Yewell,
John Enders Jr.
INVENTOR,
Max A. Th. Boehncke,
by J. R. Littell,
Attorney.

United States Patent Office.

MAX A. TH. BOEHNCKE, OF OMAHA, NEBRASKA, ASSIGNOR TO THE CONTINUOUS KILN COMPANY, OF SAME PLACE.

CONTINUOUS BRICK-KILN.

SPECIFICATION forming part of Letters Patent No. 392,985, dated November 20, 1888.

Application filed February 3, 1888. Serial No. 262,844. (No model.)

*To all whom it may concern:*

Be it known that I, MAX A. TH. BOEHNCKE, a citizen of the United States, residing at Omaha, in the county of Douglas and State of Nebraska, have invented certain new and useful Improvements in Continuous Brick-Kilns, of which the following is a specification, reference being had therein to the accompanying drawings.

This invention relates to certain new and useful improvements in continuous brick-kilns, and its object is to provide a simple and improved kiln of this character in which each arched compartment is provided with an inside and outside flue, one connecting at or opening into each side of said compartment and extending one—the outside one—under the other or inside flue, both opening into the smoke-chamber, whereby the flue-connections for the outside and inside are dispensed with, thus enabling each flue to be worked separately and independently of the other; and the invention also comprises a new and improved form of damper for the ends of the smoke-flues within the smoke-chamber.

A further object of my invention is the production of a kiln which will possess advantages in point of inexpensiveness, durability, and general efficiency.

To this end my invention consists in certain improvements over the improved continuous kiln patented August 4, 1885, No. 323,492, and over the improved kiln described in the application for patent filed July 11, 1887, No. 244,002; and it further consists in the improved construction, arrangement, and combination of parts, substantially as hereinafter set forth, and particularly pointed out in the claims.

In the accompanying drawings, Figure 1 is a horizontal sectional view taken above the foundation, and showing a continuous brick-kiln embodying my invention. Fig. 2 is a vertical transverse sectional view taken on the line $x$ $x$, Fig. 1, and showing an improved form of drier with which my improved kiln is adapted for use. Fig. 3 is a vertical longitudinal sectional view taken through the smoke-chamber. Fig. 4 is a vertical sectional detail view, showing one of the compartments and my improved form of connection of the flues therewith. Fig. 5 is an enlarged vertical sectional detail view of my improved damper. Fig. 6 is a plan view thereof. Fig. 7 is a top view of the damper-pipe. Fig. 8 is a section of a damper, $f'$.

Corresponding parts in the several figures are denoted by the same letters of reference.

Referring to the drawings, A designates the kiln, which is preferably oval in horizontal section and divided into any number of compartments, each being separated from the other.

B is a centrally-disposed smoke-chamber, divided at its center by a stationary partition, $a$.

C C' are respectively the inside and outside flues, connecting each compartment with the central smoke-chamber, the opening of the inside and outside flues into their respective compartments being directly opposed to each other, the outside flue, C', being caused to pass down and run horizontally under its compartment, and is extended, as is also the inside flue, C, into the upward extensions $b$ $b$, which open at their upper ends into the smoke-chamber.

In the ends of the vertical portions $b$ of the smoke-flue is set a corresponding cylindrical flue-pipe, D, which projects above the filling $b'$ and is provided with a peripheral flange, $b^2$, to aid in securing it in position.

E designates my improved damper, and it consists of a hollow, curved, or approximately U-shaped in cross-section, downwardly-projecting plate, $e$, having an upper right-angular flange, $e'$, which in turn is provided with a vertical flange, $e^2$, which is designed to fit around the upper portion of the flue-pipe D, and to the upper surface of the horizontal flange of the damper are rigidly secured the ends of cross-bars $e^3$, to the meeting centers of which is secured the lower end of a nutted rod, $e^4$, which projects upwardly through an opening formed in the top of the kiln, so as to permit of manipulating the dampers.

On either side of the central stationary partition of the smoke-chamber B are disposed the inner vertical ends of the smoke-chimney flues E' E', which extend outwardly, running in under the kiln-compartments to the outside of the kiln, and converge into a single flue or passage-way, E², opening at its outer end into the lower part of the smoke-stack or chimney E³, as shown, said vertical ends of these chimney-flues being also provided with dampers E⁴, seated thereon, and likewise controlled by an operating-rod. This smoke-stack or chimney is divided into two or more separate compartments, E⁵, by means of a vertical partition, E⁶, disposed transversely and extending across the interior diameter of the stack at the lower part thereof.

F is a ventilator-pipe disposed on top of the smoke-chamber and extending the full length thereof, said pipe having openings into either one of the two compartments of the smoke-chamber by means of openings or apertures $f$, which are opened or closed by dampers $f'$, also controlled by rods projecting through the top of the kiln.

The dampers $f'$ consist of a semicircular or bowled plate, F', having upper cross-rods, to the centers of which are connected the lower ends of the operating-rods F², which project up through a lid or cover, F³, disposed in the top of a circular opening in the top of the kiln, said dampers, when lowered, resting upon the upper end of a short pipe, F⁴, secured within the wall between the smoke-chamber and the main ventilator-pipe, as shown. The object of providing these two dampers is that connection between the ventilator main pipe and smoke-chamber can be effected with that one of the compartments not being used by the escaping smoke from the kilns, the smoke from the drier (shown in Fig. 2) and that from the kilns being passed in the direction of the arrows in Fig. 3 out through the chimney-flue of each compartment. Into this main ventilator-pipe open the inner ends of a series of ventilator-pipes, $f^3$, disposed at suitable distances apart throughout the bottom of the drier-chamber, said ventilator-pipes being secured, preferably in the manner shown in Fig. 2, between the top of the kiln and the bottom of the drier-chamber, said ventilator-pipes having openings through means of damper-covered extension-pipes $f^2$ into the drier-chamber at the bottom thereof, as shown in Fig. 2.

It is obvious that in connection with my invention I can employ any preferred form of drier for drying the green bricks, the preferred form herein shown consisting, briefly, of the drier-chamber G, having a series of central racks, $g\ g$, and being specifically described in a separate application, filed concurrently herewith, Serial No. 262,845.

It will of course be understood that suitable openings or passages are provided in the outer walls of the kiln and entering the compartments thereof, and that each compartment is provided with its separate inside and outside flues opening into the smoke-chamber. I am therefore enabled to work or operate each flue separate and independent from the other.

The operation and advantages of my invention will be readily understood by those skilled in the art to which it appertains, and it is manifest that numerous modifications may be made in the details of construction as herein illustrated without departing from the spirit and scope of my invention. I therefore do not limit myself to the exact construction and arrangement of parts herein shown and specified.

I claim as my invention—

1. In a continuous kiln, the compartments having each an inside and outside flue, with their openings into the said compartments opposed to each other, and having each an upward extension opening into the smoke-chamber, substantially as shown and described.

2. In a continuous kiln, the combination, with the smoke-chamber and the compartments, of the inside and outside flues, with their openings into said compartments opposed to each other, one of said flues—the outside one—running horizontally under said compartments and under the other or inside flue, and having upward extensions opening into the smoke-chamber, substantially as shown and described.

In testimony whereof I affix my signature in presence of two witnesses.

MAX A. TH. BOEHNCKE.

Witnesses:
WM. SANDELL,
JAMES O'NEIL.